United States Patent
Sher et al.

(10) Patent No.: US 7,651,008 B2
(45) Date of Patent: *Jan. 26, 2010

(54) SYSTEM FOR DISPENSING HOT AND COLD BEVERAGES FROM LIQUID CONCENTRATES

(75) Inventors: Alexander A. Sher, Danbury, CT (US); Carla D. Nuchi, Barcelona (ES); Derrick Abilay Bautista, New Fairfield, CT (US); Simon Livings, New Milford, CT (US); Elaine R. Wedral, Sherman, CT (US)

(73) Assignee: Nestec S.A., Vevey (CH)

( * ) Notice: Subject to any disclaimer, the term of this patent is extended or adjusted under 35 U.S.C. 154(b) by 410 days.

This patent is subject to a terminal disclaimer.

(21) Appl. No.: 11/608,394

(22) Filed: Dec. 8, 2006

(65) Prior Publication Data
US 2007/0080169 A1    Apr. 12, 2007

Related U.S. Application Data

(63) Continuation of application No. 10/727,532, filed on Dec. 5, 2003, now Pat. No. 7,147,131.

(51) Int. Cl.
*B67D 5/56* (2006.01)
(52) U.S. Cl. .............................. 222/129.1; 222/146.1
(58) Field of Classification Search ............. 222/129.1, 222/129.2, 129.3, 129.4, 146.1
See application file for complete search history.

(56) References Cited

U.S. PATENT DOCUMENTS

| | | | |
|---|---|---|---|
| 2,537,119 A | 1/1951 | Bauerlein et al. ............. 225/21 |
| 3,152,728 A | 10/1964 | McCarter ................. 222/129.4 |
| 3,986,642 A * | 10/1976 | Selvia et al. ............. 222/129.1 |
| 4,392,588 A | 7/1983 | Scalera ..................... 222/129.4 |
| 4,676,401 A | 6/1987 | Fox et al. ........................ 222/1 |
| 4,753,370 A * | 6/1988 | Rudick ..................... 222/129.1 |
| 5,033,651 A | 7/1991 | Whigham et al. ........... 222/145 |
| 5,803,320 A | 9/1998 | Cutting et al. .............. 222/641 |
| 5,875,930 A | 3/1999 | Nakajima et al. ........ 222/129.1 |
| 6,047,859 A | 4/2000 | Schroeder et al. ............... 222/1 |
| 6,142,340 A | 11/2000 | Watanabe et al. ............. 222/66 |
| 6,305,269 B1 | 10/2001 | Stratton ..................... 99/323.1 |

FOREIGN PATENT DOCUMENTS

FR    1472222    3/1967

* cited by examiner

Primary Examiner—Kevin P Shaver
Assistant Examiner—Jonathan Wood
(74) Attorney, Agent, or Firm—Winston & Strawn LLP

(57) ABSTRACT

The invention concerns a device for dispensing a beverage comprising a mixture of liquid, e.g. water, and at least one liquid concentrate, with at least two liquid nozzles connected respectively to at least one liquid source for producing a first jet of liquid in air along first path and a second jet of liquid in air along a second path, at least one concentrate nozzle connected to at least one liquid concentrate source for delivering a stream of liquid concentrate in air along a third path, wherein the liquid nozzles and the concentrate nozzle are oriented with respect to each other so that the first, second and third paths intersect above a container at a common intersection point, whereby the mixture is formed by collision of the respective jets and the stream(s).

19 Claims, 3 Drawing Sheets

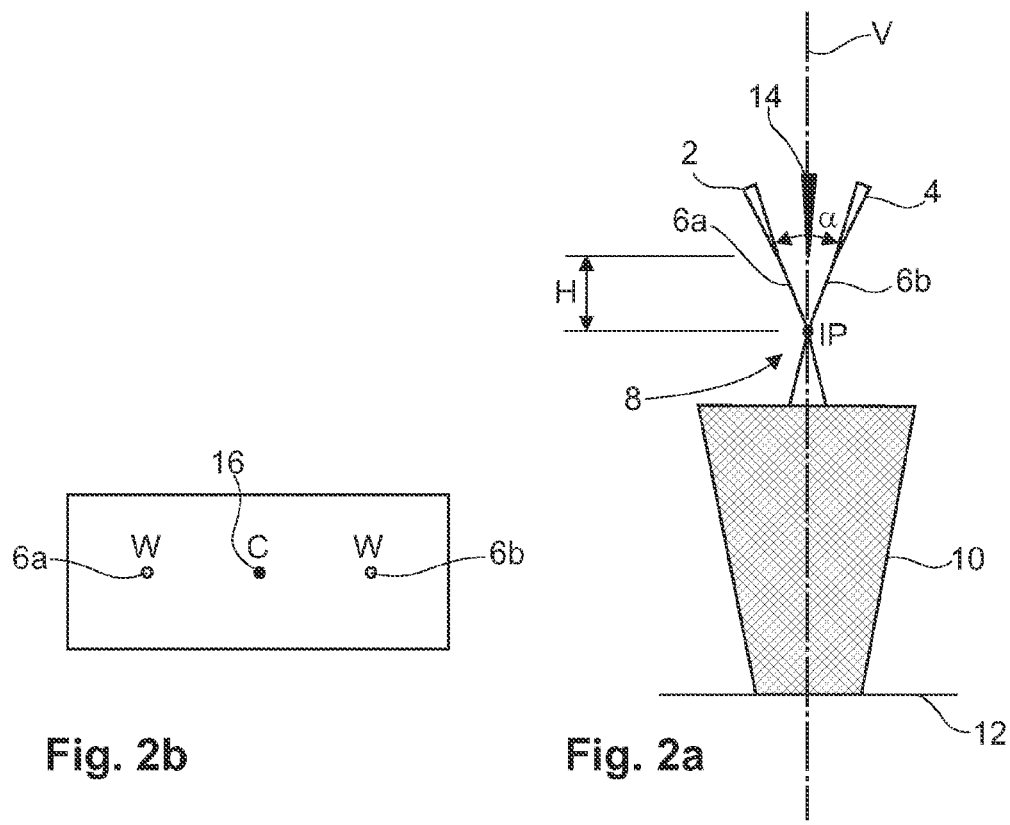
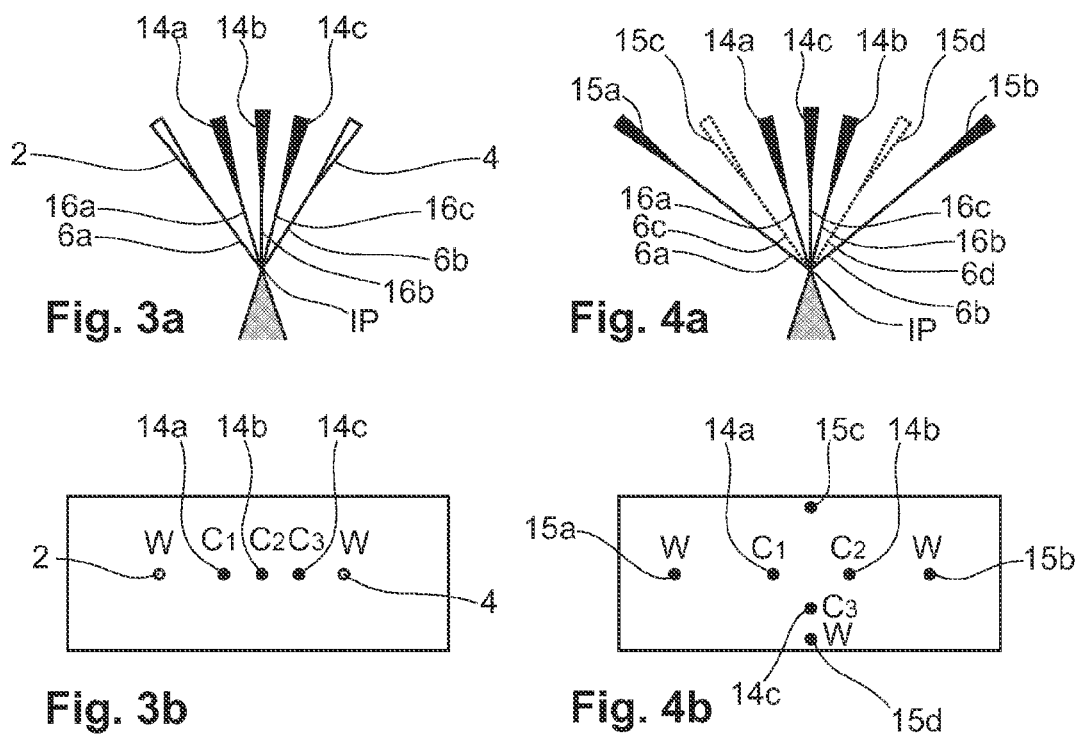
Fig. 2b    Fig. 2a
Fig. 3a    Fig. 4a
Fig. 3b    Fig. 4b

SYSTEM FOR DISPENSING HOT AND COLD BEVERAGES FROM LIQUID CONCENTRATES

CROSS-REFERENCE TO RELATED APPLICATIONS

This application is a continuation of application Ser. No. 10/727,532 filed Dec. 5, 2003, now U.S. Pat. No. 7,147,131.

FIELD OF THE INVENTION

The present invention relates generally to beverage dispensing apparatus. More particularly the invention concerns a dispenser system and a method for dispensing hot or cold beverages or the like reconstituted from liquid concentrates which does not use any mixing or whipping chambers.

BACKGROUND OF THE INVENTION

Conventional hot or cold beverage dispensing systems are widely used in offices, convenience stores, restaurants, homes, etc.

One type of widely used beverage dispenser system uses an impeller, such as blades, disc, etc., driven in rotation by an electric motor that mixes powder such as coffee or tea powder or syrup with a hot or cold liquid such as liquid in a whipping bowl or chamber before being dispensed in a cup. A system of this type is described for example in U.S. Pat. No 4,676,401.

Systems of this type are sometimes expensive and cumbersome as a space is required for a mixing bowl or whipper-chamber and impeller engine. Further, in order to avoid hygienic issues, due to residual product left in the whipper-chamber and/or on the impeller, these systems require certain maintenance and periodic cleanings. Moreover, when using powders, precipitation of non-dissolved powder particles as well as stratification of liquids in a cup after dispensing may occur, especially at ambient temperature. "Stratification" in this usage refers to the amount of heterogeneity at different levels in the liquid part of the product.

Another type of system for producing and dispensing whipped soft drinks, such as hot chocolate and beverages, without using a mechanical whipping mechanism, such as rotating blades, has been proposed in U.S. Pat. No. 6,305,269. In this system, the whipping of the mixture of syrup and water used to produce the beverage is achieved by intermixing, within a vented mixing chamber, intersecting streams of syrup and water that are directed toward an intersection point under pressure. Even though this system eliminates the use of an impeller in the mixing chamber, the wall of the mixing chamber after it has been used becomes quickly soiled by residues so the hygiene is still an issue and periodical cleaning of the mixing chamber is still required. As the cleaning operations often require the mixing chamber to be removed they are labour-intensive and costly. Moreover, it has been shown that the foam obtained with this system using one water jet and one concentrate jet typically had a soapy appearance with large bubble size, and stability was extremely poor.

An improved system is needed that is better suited for producing certain products, such as cappuccino-type beverages, with an optimal foam layer, and that preferably can reduce cleaning required.

SUMMARY OF THE INVENTION

The invention relates to a food product dispenser. A preferred embodiment of the dispenser has a fluid source, a fluid nozzle, a flowable food component source, a food component nozzle, and a delivery device. The delivery device connects the fluid source to the fluid nozzle and the component source to the component nozzle for delivering a fluid and a food component from the respective source to the respective nozzle. The delivery device and nozzles are preferably configured such that the fluid and component are ejected from the fluid and component nozzles, respectively, in fluid and component streams, respectively, which intersect each other at an intersection location in which at least one of the streams is substantially in state of free fall, and advantageously in an unsupported state. Preferably, at the intersection location the streams are detached from any solid structure, such as one that can substantially redirect the streams. The delivery device and nozzles are preferably configured for ejecting the streams in a configuration such that the streams mix by collision to produce a food product which is directed to a dispensing location, such as into a container. A preferred container is a drinking cup, although other embodiments are preferably configured for dispensing a small number of servings, preferably one or two, into a container for immediate personal consumption, although other embodiments can dispense a greater number of servings, such as less than five or ten. The preferred dispenser is a food-service dispenser. In the preferred embodiment, the streams at the intersection location are unsupported by any structure that can control the flow path.

In the preferred embodiment, the fluid stream is a jet, with the speeds of the streams, or alternatively average speed of the streams, being reduced downstream of the intersection location. Also, a dispensing bay of the dispenser is preferably configured for receiving a container in the dispensing location for receiving the food product, and the food product is a beverage. Preferably, the fluid is water, and the component is a concentrate, such as a liquid concentrate.

The fluid nozzle can comprise at least two fluid nozzles, and the fluid stream can comprise at least two fluid streams that intersect at the intersection location. Ejection orifices of the component nozzles are preferably disposed closer than the ejection orifices of the fluid nozzles to a common central axis of the streams that extends through the intersection location. The central axis can be substantially vertical, and the component nozzle in one embodiment is configured for directing the concentrate stream substantially along the central axis. In one embodiment, the angle between first and second streams at the orifices is about between 20 and 60 degrees. The flow rate and linear velocity delivered through each of the fluid nozzle orifices in an embodiment is between about 5 and 15 ml/s and 600 to 1300 cm/s, respectively, and the component is a liquid concentrate with a viscosity between about 300 and 1500 cP. The orifices of the fluid nozzles preferably have diameters between about 0.5 and 1.5 mm, and the component nozzle has a diameter of between about 1 and 3.5 mm. A preferred distance between the fluid nozzles and the intersection location is between about 1 and 200 mm.

The delivery device can comprise a fluid pump configured for pumping the fluid from the fluid source to the fluid nozzle at a sufficient flow rate for producing the fluid stream, and a component pump configured for pumping the component from the component source to the component nozzle at a sufficient flow rate for producing the component stream. At least one of the pumps is preferably configured to deliver pulses of the fluid or component, such as a peristaltic pump. A controller is preferably associated with the pumps for controlling the flow rates.

The component source preferably comprises a plurality of component sources, and the component nozzle preferably comprises a plurality of component nozzles for dispensing different components from the component sources to the intersection location. In a preferred embodiment, the delivery device is configured for selectively activating and deactivating the flow from the component nozzles for dispensing a selected combination of one or more of the components to the intersection location depending on the type of food product selected for dispensing. The controller can be configured for controlling the delivery device for sequentially simultaneously dispensing the components to the intersection location. Additionally, a thermal exchange unit configured for heating or cooling the fluid to be dispensed can be provided.

In a preferred method of the invention for preparing a food product, streams of a fluid and a food component are directed from a dispenser towards an intersection location at which the streams are substantially in a state of unsupported free fall, such that the streams mix by collision and fall into a container to prepare a food product. The average speed of the streams is preferably reduced downstream of the intersection location, and the fluid stream preferably comprises a plurality of fluid jets directed toward the intersection location.

A plurality of component streams can be directed toward the intersection location, with the component streams comprising different components. A preferred embodiment if the method includes entering a selection of a type of food product to be dispensed, such as through a user interface, and selectively activating and deactivating the different component streams for dispensing a selected combination of one or more of the components to the intersection location depending on the type of food product selected.

The invention thus offers a dispenser and method with reduced complexity, but capable of delivering high quality dispensed food product.

BRIEF DESCRIPTION OF THE DRAWINGS

FIG. 2a is a front view of a detail of FIG. 1 showing an example of spatial orientation of the nozzles of a beverage dispensing device according to the invention comprising one concentrate nozzle and two water nozzles;

FIG. 2b is a cross-sectional bottom view of the water and concentrate nozzles shown in FIG. 2a;

FIG. 3a is a front view of a detail of FIG. 3 showing schematically an example of spatial orientation of the nozzles of a beverage dispensing device illustrated in FIG. 3;

FIG. 3b is a cross-sectional bottom view of the water and concentrate nozzles shown in FIG. 3a;

FIG. 4a is a front view similar to FIG. 3a showing schematically an example of spatial orientation of the nozzles of a beverage dispensing device comprising three concentrate nozzle and four water nozzles; and FIG. 4b is a cross sectional bottom view of the water and concentrate nozzles shown in FIG. 4a.

DESCRIPTION OF PREFERRED EMBODIMENTS

Figure 1:
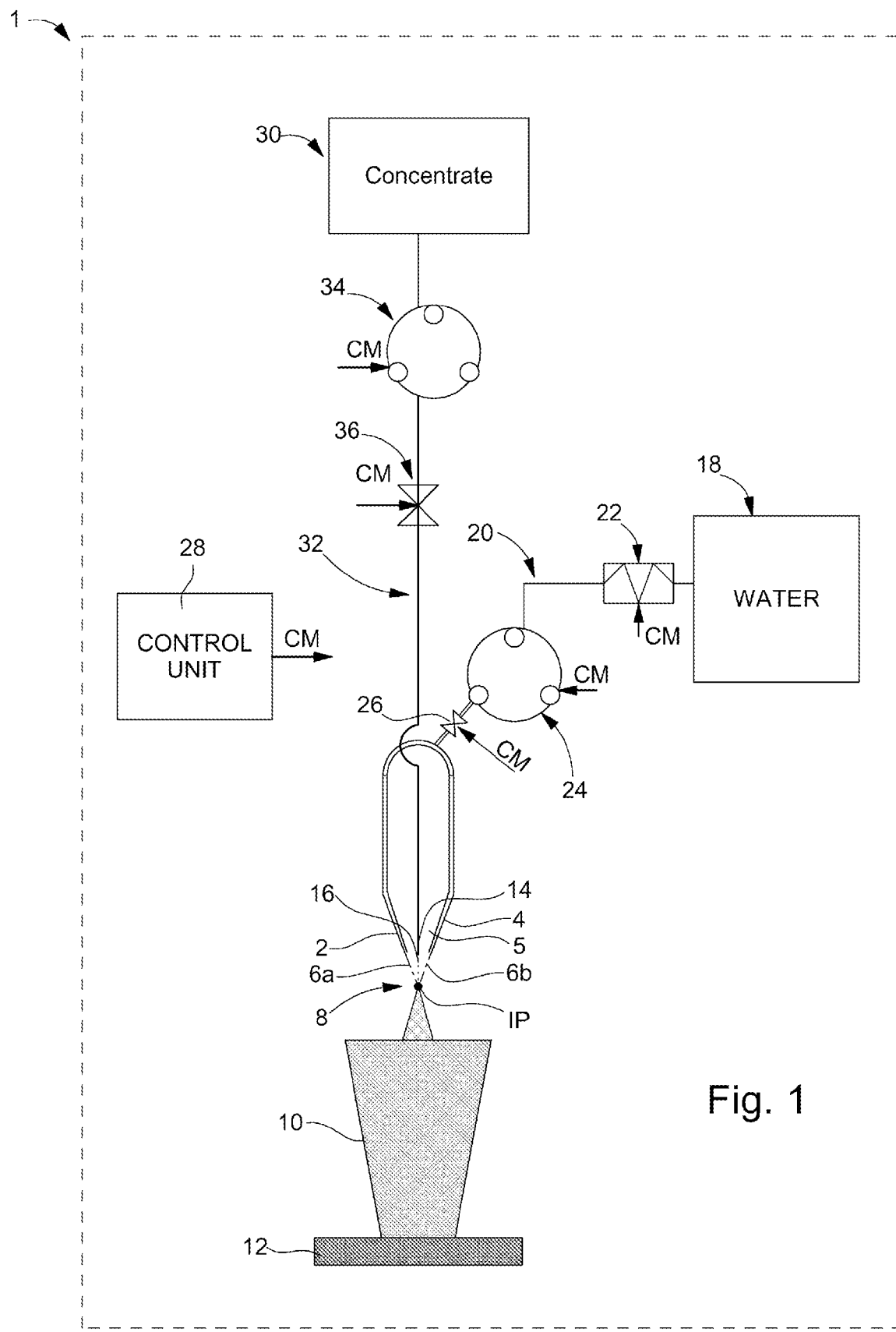
FIG. 1 is a diagram schematically showing one embodiment of a beverage dispensing device according to the invention.

The present invention can provide a device for dispensing a hot or cold beverage that is hygienic, efficient, compact, and relatively low cost to run and maintain. This can be obtained without the use of a mixing or whipping chamber, which consequently requires very little maintenance and is highly hygienic. A preferred embodiment of the invention provides a device for dispensing a hot or cold beverage which is able to deliver a beverage with good foaming at fairly high temperatures (typically above 65° C.) without requiring the use of mechanical whipping mechanism, producing uniform high quality beverages from a concentrate. The preferred embodiment is also preferably suitable for large scale, high volume usage.

The invention concerns a device for dispensing a beverage comprising a mixture of water and at least one concentrate, preferably a liquid concentrate. The preferred device comprises at least two water nozzles connected respectively to at least one fluid source, which is preferably a water source, for producing a first jet of fluid in air along a first path and a second jet of fluid in air along a second path, at least one concentrate nozzle connected to at least one concentrate, preferably liquid concentrate, source for delivering a stream of preferably liquid concentrate in air along a third path. Preferably, the fluid or water nozzles and concentrate nozzle are oriented with respect to each other so that the first, second, and third paths intersect at a common intersection point, preferably above a container, whereby the mixture is formed by collision of the respective jets and the stream(s), the resulting flow of mixture preferably having a reduced velocity and being directed into the container.

As a result of these characteristics, a beverage dispensing and mixing device can be obtained in which two or more water streams collide in the air at a meeting point above a container such as a cup, which provides a preferably fan-shaped spray or shower cloud of water/air fine bubbles. The meeting point of water jets and concentrate stream(s) is positioned such that after leaving the nozzles the water jets and concentrate stream(s) collide and mix in the air before reaching the container. The splashing at the meeting point is surprisingly little so that the use of a mixing chamber is not required. Indeed it has been found out that flow velocity of the water and concentrate after meeting point becomes significantly lower, resulting in significant reducing of splashing. This is particularly advantageous when dispensing over ice, for example. The streams of one or more concentrates can be directed to the point of the meeting of two or more water jets so that it can be advantageously used to dispense a large selection of beverage types without any risk of cross contamination. Although some embodiments can additionally use them, the preferred embodiments of the invention also have the advantage of not requiring the use of mixing bowls, impellers or mixing chambers to operate, thereby eliminating the costly cleaning procedures while improving hygienic performance.

Another advantage of the device of the invention resides in its simplicity and in particular in the reduced number of mechanical and electrical parts which improves its reliability and facilitates its maintenance. Yet another advantage of the device of the invention is that no contact between the water and the concentrate needs to occur within the device, which allows concentrates to be used that are shelf stable due to their formulations.

It will also be noted that the device of the invention allows a high turbulent flow at the meeting point to be generated, which produces an uniform liquid beverage at both hot and ambient temperatures. In addition, the device of the invention allows beverages with good foam at hot temperatures (using for example 60-100° C. water) to be prepared, the foaming occurring by air incorporation at the point where the streams meet before reaching the container. This property is desirable for preparing and dispensing hot beverages, such as coffee or liquid chocolate beverages or the like from concentrates.

According to a preferred embodiment of the device of the invention, the concentrate nozzles and the water nozzles each comprises an ejection orifice. The ejection orifices of the concentrate nozzles preferably are closer to an axis passing through the common intersection point, which in this embodiment is a vertical axis and preferably perpendicular to a support of the container, than the ejection point of the water nozzles and water jets, which are preferably are arranged spatially with respect to each other so as to extend substantially symmetrically with respect to the liquid concentrate stream. When the dispensing device comprises only one concentrate nozzle, the liquid concentrate stream preferably extends along a vertical axis so as to facilitate the delivery of the concentrate towards the common intersection points. The device of the invention may comprise a first pumping mechanism arranged between the water source and water nozzles for controlling the water flow rate, and a second pumping mechanism arranged between each of said liquid concentrate sources and said concentrate nozzles for controlling the flow rate of the liquid concentrate. Both the amount of water and the amount of concentrates can thus be supplied and dosed in an appropriate and accurate manner. Preferably, the pumping mechanisms are pulse delivery type pumps, such as a peristaltic pumps. Indeed, the use of this type of pump allows an improved mixing and foaming of the dispensed liquids by creating pulsing of thereof.

Advantageously, the device of the invention can further comprise thermal exchange units for heating or cooling the sources to offer the option of dispensing hot or cold beverages on demand.

Preferably, the device of the invention comprises a plurality of concentrate nozzles respectively connected to a plurality of liquid concentrate sources for delivering a plurality of streams of liquid concentrate in air along a plurality of concentrate paths, each of said plurality of concentrate paths being directed to said intersection point, the pumping mechanism being associated with a controller for controlling and preferably switching on or off each of the liquid concentrate sources according to a desired predetermined combination of liquid concentrates. The controller is preferably arranged so as to switch the liquid concentrate sources on or off either sequentially or simultaneously. Consequently the device allows more than one concentrate to be delivered simultaneously or sequentially one after the other by appropriate control by the controller based on the desired final product. The preferred concentrates can be coffee, cocoa, milk concentrates or a combination of these, or other suitable concentrates.

The invention also concerns a method for preparing a beverage comprising a mixture of water and at least one liquid concentrate, in which a preferred embodiment comprises:

producing at least first and second jets of water in air respectively along first and second paths from a water source through respectively first and second water nozzles; and delivering at least one stream of liquid concentrate in air along a third path from at least liquid concentrate source through a concentrate nozzle, wherein said liquid concentrate delivery occurs during the production of said first and second water jets, and wherein said first, second and third paths intersect above a container at a common intersection point, whereby said mixture is formed by collision of said respective jets and said stream(s), the resulting flow of mixture having a reduced velocity and being directed into the container.

Other features and advantages of the present invention will appear more clearly upon reading the following description of preferred embodiments of the dispensing system according to the present invention, this description being made with reference to the annexed drawings.

Referring to FIG. 1, a first embodiment of a beverage dispensing device according to the invention capable of implementing the method of the invention is shown and designated by the general reference numeral 1. A beverage is herein to be understood to mean any beverages, hot or cold, that can be prepared from at least one concentrate such as a syrup, a coffee concentrate, a cocoa concentrate, a milk concentrate, tea concentrate etc. or a combination thereof, mixed with a liquid such a water to produce a beverage suitable for consumption such as a soft drink, a coffee drink, etc. As will be explained hereinafter, the beverage dispensing device according to the invention is also able to produce and dispense a beverage with a foam layer having a good consistency and stability.

In the embodiment shown in FIG. 1, dispensing device 1 comprises a first nozzle 2 and a second nozzle 4 for supplying a liquid 6, such as water. The water 6 in this embodiment is supplied in the form of a first stream or jet 6a and a second stream or jet 6b of water through the atmosphere from water ejection orifices. Fluids other that water can alternatively be used. Water jets 6a and 6b are directed respectively along a first path and a second path toward a mixing region 8. Nozzles 2 and 4 are oriented with respect to each other so that first jet 6a and second jet 6b intersect at a common intersection point IP disposed in mixing region 8, thereby forming a fan-shaped spray cloud 7.

The mixing region and the jets and streams are preferably positioned such that the beverage components in the spray cloud 7 are directed into container 10. Preferably, mixing region 8 is situated above a container 10 for collecting the beverage dispensed by dispensing device 1 therein. The container 10 is, for example, placed on a support 12 attached to a frame of the device 1 to which the reset of the device parts are preferably mounted.

The dispensing device further comprises a third nozzle 14 for supplying a concentrate in the form of a jet or stream 16 of concentrate through the atmosphere along a third path from a concentrate ejection orifice. Nozzle 14 is oriented so that stream 16 extends to intersection point IP so that water jets 6a and 6b and concentrate stream 16 collide at intersection point IP thereby mixing in the air and in free fall the water and the concentrate to form a resulting flow of mixture, preferably having a significantly reduced velocity with respect to that of the water jets 6a, 6b. The flow of mixture is preferably collected in container 10, and the intersection point IP is preferably disposed remotely from surfaces of the device such that the jets 6a, 6b and stream 16 mix at a location not in contact with a surface of the device or container 10, essentially in a state of free fall, and preferably through the air. As flow velocity of the mixture after the collision of the water jets and concentrate stream is significantly reduced, splashing is avoided and the use of a mixing chamber can be eliminated. Preferably, the flow velocities of both the water jets and concentrate streams are reduced due to the collision at the intersection point.

Liquid nozzles 2,4 are connected respectively to a source 18 of liquid, such as water in the present example, via a supply line 20. In this embodiment, which allows the production of both hot and cold beverages, supply line 20 includes a thermal exchange unit 22, a pump 24, and a valve 26, which are all controlled by a control unit 28, such as micro-controller CM in the drawings. Preferably, thermal exchange unit 22 is of the on-demand, tankless, water heating/cooling type, connected to a water tap line. In an alternative embodiment, a hot water tank or cooling tank can be used instead or in additional to the thermal exchange unit 22. Pump 20, which allows the water flow rate to be controlled, is preferably of the pulsing water-delivery type, such as a peristaltic pump. This type of pump allows pulsed water jets to be generated, providing the advantage of contributing to the mixing of the water and the concentrate and to the production, amount and quality of the foam layer formed on the dispensed beverage. It will be noted, however, that the peristaltic pump can be replaced by another type of pump, such as diaphragm pump, or can be omitted if tap water pressure is sufficiently high for generating an appropriate water flow rate.

Concentrate nozzle 14 is connected to a source of liquid concentrate 30 via a supply line 32, including a pump 34 and a valve 36 controlled by control unit 28. Pump 34, which allows the concentrate flow rate to be controlled, is preferably of the same type as pump 24 described above. The source of liquid concentrate 30 would typically be formed of a pouch filled with liquid concentrate arranged in an appropriate holder for easy refill. The concentrates used for dispensing are preferably shelf-stable due to their formulation. Typically, appropriate liquid concentrates contain 0.1-0.2% potassium sorbate, and have a pH less than 6.3 and water activity less than 0.85.

The orientation of water jets 6a and 6b with respect to each other is preferably selected for achieving a good mixing of the water and the concentrate, as well as for the formation of a good layer of foam on top of the prepared beverage, the concentrate stream being directed to the collision point IP of water jets 6a et 6b. The orientation of water jets 6a and 6b with respect to each other is also important and is preferably selected to avoid splashing during dispensing. Thus, beverage velocity after meeting common intersection point IP and the spread angle of fan-shaped cloud 7 depend on water jets orientation. The angle α between water jets 6a and 6b, shown in FIG. 2a, may vary from about 1 degree, more preferably from about 20 degrees, and most preferably from about 25 degrees, to preferably about 80 degrees, more preferably to about 60 degrees, and most preferably to about 35 degrees. In the embodiment shown, which uses two water jets 6a and 6b, the jets 6a and 6b are oriented symmetrically with respect to a vertical axis V passing by common intersection point IP, and angle α was chosen to be 30°. The vertical axis V thus preferably bisects the angle α. The distance H (FIG. 2a) between the ejection orifices of the nozzles and the common intersection point IP also affects the mixing and is preferably selected for guaranteeing an efficient mixing of water and concentrate and for minimizing splashing. Typically the distance height is set to range from 2 to 5 cm and is preferably of about 2.5 cm.

In this example comprising only one concentrate nozzle, concentrate stream 14 extends along vertical axis V. More generally, the preferable position of the concentrate ejection orifice with respect to the position of the water ejection orifice is such that ejection orifice of the concentrate nozzle is closer to vertical axis V than the ejection point of said liquid nozzles. Preferably, the distance between a container 10, such as a cup, and the water nozzle jets is adjusted to be in desired range to avoid beverage delivery outside a conventional diameter cup, which is typically less than about 10 cm, although the width of the cloud 7 can be made greater for delivery in wider containers, such as bowls, or narrower for smaller or differently shaped containers. We will also note that the paths of water and concentrate jets are preferably positioned in a single plane (FIG. 2b), although they can alternatively be positioned in other orientations, such as regularly distributed along a conical surface.

Water nozzles 2, 4 and concentrate nozzle 14 may be structurally independent of each other to allow easy adjustment of their respective orientation. But the water nozzles and the concentrate nozzles may alternatively be constructed in a single integral or unitary unit, thereby facilitating the maintenance and/or the replacement of these nozzles.

To obtain a satisfactory mixing effect, the water flow rate delivered through each water nozzle 2, 6 is also of importance and is controlled by control unit 28 via pump 24 so as to vary preferably from about 5 ml/s, more preferably from about 7.5 ml/s, and most preferably from about 9 ml/s, preferably to about 25, more preferably to about 14 or 15 ml/s, and most preferably to 12 ml/s. Although it is preferable that the water flow rates for each nozzle to be substantially the same, these water flow rates may be different depending, for example, on the distance separating the ejection orifice of a nozzle from the intersection point IP.

Typically, the diameter of ejection orifice of water nozzles 2 and 4 ranges from about 0.5 to about 1.5 mm and is preferably of about 1.2 mm. The water flow rate plays a role in the production of the foam on top of the beverage with respect to the initial foam-to-liquid ratio and the stability of the foam after delivery.

Table 1 hereinafter show experiment results illustrating the influence of the water flow rate on the initial foam to liquid ratio, i.e. the ratio of the height or thickness of the foam layer produced on the liquid portion of the beverage to the height of the liquid portion of the beverage in a container, such as a cup, immediately after delivery.

TABLE 1

| Flow rate, ml/s | Initial Foam to Liquid ratio |
|---|---|
| 2.4 | 0.1 |
| 5.1 | 0.21 |
| 7.7 | 0.35 |
| 10.3 | 0.38 |
| 11.7 | 0.51 |
| 15.2 | 0.80 |
| 21.7 | 1.11 |
| 25.2 | 1.03 |
| 29.3 | 1.03 |

Table 2 below show experiment results illustrating the influence of the water flow rate on the stability of the foam layer produced on the liquid portion of the beverage after delivery, i.e. the ratio of the height or thickness of the foam layer produced on the liquid portion of the beverage 10 seconds after delivery to the height or thickness of the foam layer after immediately after delivery.

TABLE 2

| Flow rate, ml/s | Stability, % |
|---|---|
| 2.4 | 34.9 |
| 5.1 | 35.3 |
| 7.7 | 37.3 |
| 10.3 | 55.9 |
| 11.7 | 58.5 |
| 15.2 | 32.1 |
| 21.7 | 34.1 |
| 25.2 | 26.8 |
| 29.3 | 25.7 |

It is seen from Tables 1 and 2 that a beverage with a foam layer having a particularly good initial foam-to-liquid ratio and foam layer having a good stability can be obtained with a water flow rate between approximately 10 ml/s and 12 ml/s.

The liquid concentrate viscosity plays also a, important role in achieving a good mixing and dilution with the water for the production of a high quality beverage. In a preferred embodiment, the concentrate viscosity is selected within the range from preferably about 1 cP, more preferably from about 300 cP, and most preferably from about 400 cP, to preferably about 5,000 cP, more preferably to about 1500 cP, and most preferably to about 600 cP.

Typically, the diameter of ejection orifice of concentrate nozzle 14 ranges from about 1 to 3.5 mm, preferably from about 1.2 to 2.4 mm, and most preferably from about 1.3 to 1.9 mm. Further, the concentrate flow rates are controlled by control unit 28 via pump 34 so as to vary from preferably about 2 ml/s, more preferably from about 2.5 ml/s, and most preferably from about 3 ml/s, preferably to about 45 ml/s, more preferably to about 10 ml/s, and most preferably to about 5 ml/s.

It should be noted that the water linear velocity through nozzles 2 and 4 not only affects achieving a good mixing, but also the control of the amount of foam created on top of the beverage. Test have shown that water linear velocity should be controlled to range from preferably about 10 cm/s, more preferably from about 650 cm/s, and most preferably from about 800 cm/s, preferably to about 2000 cm/s, more preferably to about 1250 cm/s, and most preferably to about 1100 cm/s, taking into account that a higher water velocity produces a higher the amount of foam. However one will note in this respect that very high linear velocity results in undesirable foam appearance (very large bubbles) and texture. For example, for cappuccino type beverages prepared from viscous liquid with viscosity from 500 to 1500 cP, the preferable linear velocity for foam generation and stability is from 900 to 1050 cm/s. To achieve whiter foam, water may be delivered for a slightly longer period than the concentrates. On the other hand, linear velocity should preferably not exceed about 500 cm/s for preparing a beverage without foam. The water linear velocity can be readily adjusted via an adequate control of the pump 24 by control unit 28.

Tests have also shown that the relation between concentrate viscosity and flow rate plays a significant role for mixing, especially at ambient temperature. For highly viscous concentrate, having a viscosity on the order of 1,500 cP, good mixing of the concentrate with the water requires a water linear velocity of about 400 cm/s, while for less viscous concentrate, having a viscosity of the order of 300 cP, a water linear velocity of about 100 cm/s produces a homogeneous beverage.

Moreover, to avoid stratification of the liquid portion of the beverage, i.e., the amount of heterogeneity of the liquid portion, care must also be taken to adjust the water linear velocity through nozzles 2 and 6 as a function of the viscosity of the liquid concentrate. Tests have shown that stratification decreases with an increase of the water linear velocity and that substantially no stratification was observed with water linear velocity of 600 cm/s and above for liquid concentrate viscosity of 1500 cP and above.

Figure 3:
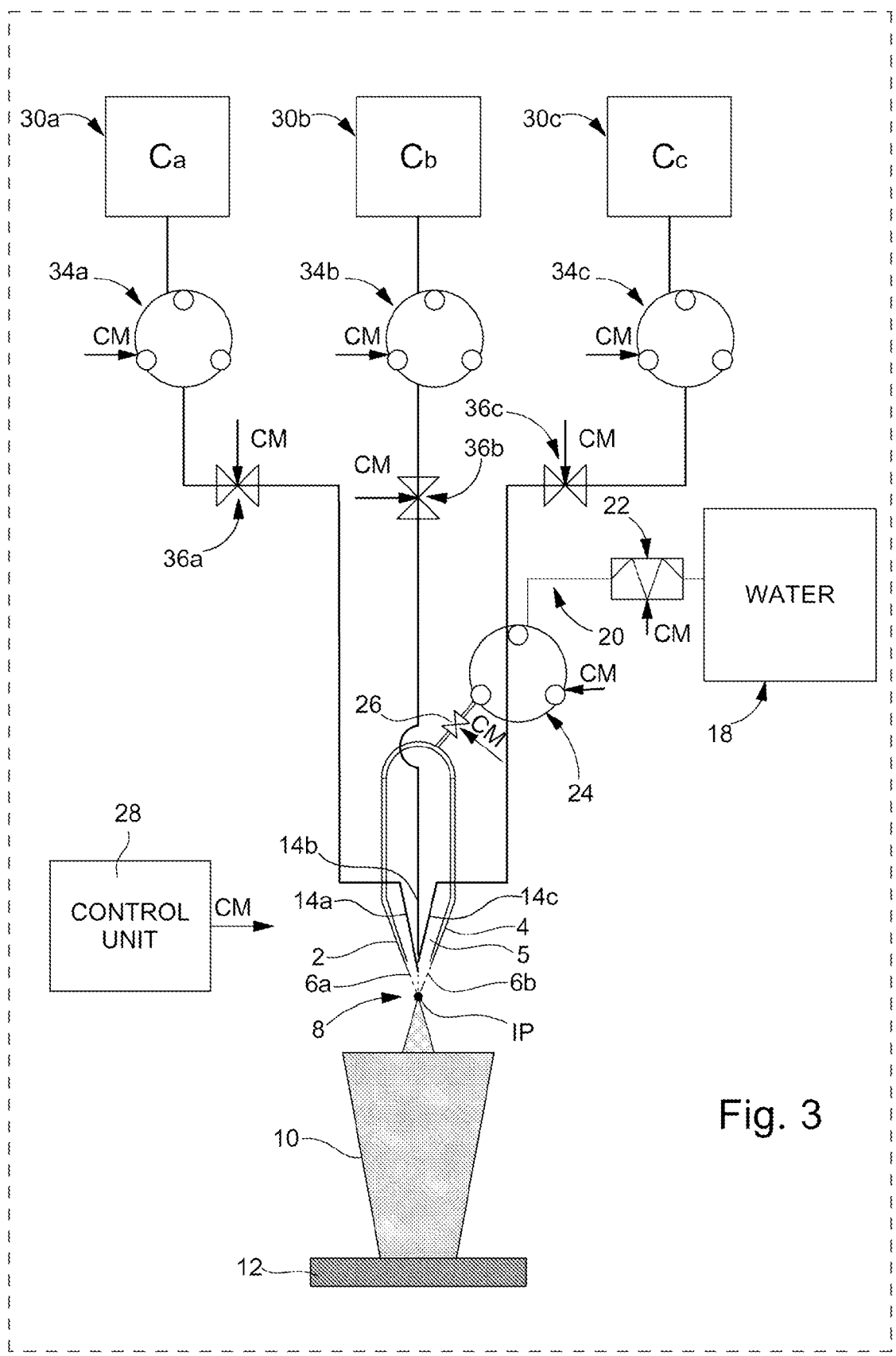
FIG. 3 is a diagram schematically showing another embodiment of a beverage dispensing device according to the invention comprising three concentrate nozzle and two water nozzles.

Referring now to FIGS. 3, 3a and 3b, another embodiment of a beverage dispensing device according to the invention capable of implementing the method of the invention comprising three concentrate nozzles and two water nozzles is shown. Similar or identical elements to these described in connection with FIGS. 1, 2a and 2b bear the same reference numerals in FIGS. 3, 3a and 3b.

In this embodiment, the beverage dispensing device comprises three concentrates nozzles 14a, 14b, 14c, respectively connected to a plurality of different liquid concentrate sources 30a, 30b, 30c for delivering a plurality of streams 16a, 16b, 16c (FIGS. 3a and 3b) of liquid concentrates Ca, Cb, Cc in the air, preferably substantially in unsupported free fall, along a plurality of concentrate paths. Each of the three concentrate paths is directed to common intersection point IP where water jets 6a and 6b also meet so as to achieve the mixing of the water with the liquid concentrate. In FIG. 3, the concentrate paths meet before the intersection point IP where all the concentrate paths and water paths meet, whereas the paths in FIG. 3a all meet substantially for the first time at the intersection point IP. As in the first embodiment, concentrate nozzles 14a, 14b, 14c are each connected to concentrate sources 30a, 30b, 30c via respective pumps 34a, 34b, 34b and valves 36a, 36b, 36c controlled by control unit 28, which preferably is provided as a control device for switching on or off the corresponding liquid concentrate sources 30a, 30b, 30c according to a desired predetermined selection or combination of liquid concentrates for preparing the desired beverage. Depending on the desired beverage, control unit 28 can be programmed to deliver two or more concentrates sequentially or simultaneously. For example for the preparation of Mocha drinks, French Vanilla and hot chocolate concentrates are typically dispensed simultaneously.

It is to be noted that one same concentrate can be delivered using one or more nozzles, from the same or different concentrate sources. As in the embodiment described in connection with FIG. 1, control unit 28 can be configured to control the various parameters of water and liquid concentrate delivery via the respective pumps. The number of water and/or concentrate jets are not limited to those shown in FIGS. 1 and 2. Referring to FIGS. 3a and 3b, an example of an orientation of the water jets 6a and 6b and the concentrate jets is shown with respect to each other. In this example the two water jets 6a and 6b and concentrate jets 16a, 16b and 16c are positioned in a single plane, the concentrate jets 16a, 16b and 16c being arranged between the water jets 6a and 6b. Consequently the angle between the water jets 6a and 6b will be slightly larger than that where only one or two concentrates nozzles are used so as to leave enough room to accommodate the number of concentrate nozzles arranged between the water nozzles 2 and 4. Depending on the room required, the angle may vary between 1 to 180 degrees, preferably from 20 to 60 degrees, and most preferably from 25 to 35 degrees. In this example the angle chosen was about 60°. It will also be noted that, if the dispensing device of the embodiment comprises two concentrate nozzles or more, these nozzles will be preferably arranged preferably symmetrically and as close as possible taking into account the limitation of the design and the size of the nozzles and supply lines thereof.

FIGS. 4a and 4b show another example of a spatial orientation of the nozzles of a beverage dispensing device comprising three concentrate nozzles 14a, 14b, and 14c and four water nozzles 15a, 15b, 15c, and 15d, the streams or jets delivered by these nozzles meeting at a common intersection point where the mixing of the water and at least one liquid concentrate occurs. In this example the four water jets are arranged symmetrically with respect to a vertical axis in pairs around the three concentrate jets 16a, 16b and 16c. As in the first embodiment, the angle formed between the water jets of each pair may vary between 1 to 180 degrees, preferably from 20 to 60 degrees, and most preferably from 25 to 35 degrees, the choice of this angle depending on the room necessary for accommodating the number of concentrate nozzles arranged within the perimeter defined by the water nozzles.

A method for preparing a beverage comprising a mixture of liquid and at least one liquid concentrate will now be described hereinafter in connection with the embodiment shown in FIG. 1. In a first step, the container 10 is placed in a serving position on support 12 of dispensing device 1 so as to be in the path of the dispensed water and concentrate downstream of the intersection point IP, preferably substantially the below water and liquid concentrate ejection orifices of the water nozzles 2 and 4 and concentrate nozzle 14. Where the nozzles dispense the water and concentrate in a vertically symmetric manner, the container 10 is preferably centered about common intersection IP of the water jets 6a and 6b and concentrate stream 16.

Upon actuation of a switch associated with the control unit 28, the control unit 28 causes first the activation of water pump 24 and the opening of water valve 26 to produce the water jets 6a and 6a in air via water nozzles 2 and 4 respectively along a first and a second paths from water source 18. The water nozzles 2 and 4 are oriented so that the water jets 6a and 6b thus produced intersect above container 10 at common intersection IP in mixing region 8.

If a hot beverage desired, such as based on a user input, control unit 28 will also activate thermal exchange unit 22 so as to heat the water to the desired temperature. Control unit 28 also causes the activation of concentrate pump 34 and the opening of concentrate valve 36 to produce concentrate stream 16 in air via concentrate nozzle 14 along third path 32 from concentrate source 30. Concentrate nozzle 14 is oriented so that the concentrate stream 16 thus produced intersects with water jets 6a and 6b also above container 10 at common intersection IP in mixing region 8 whereby an homogeneous mixture of water and concentrate is formed by collision of the water jets and concentrate stream. The resulting flow of mixture has therefore a reduced velocity and can be easily directed into the container 10 without splashing.

Once the quantity of water and concentrate to be delivered has been reached control unit 28 causes the valves 26 and 36 as well as pumps 24 and 34 to stop. Container 10 filled with a beverage formed of the mixture of water and one concentrate can then be removed from support 12.

It should be noted that control unit 28 is preferably arranged so as to cause the concentrate to be delivered only when water jets are produced. In that respect it will be noted that in the case where more that one water pump is used, the control of these water pumps is preferably arranged so as to deliver the water jets in a synchronized manner, at least during the delivery of the concentrate, to achieve the desired mixing effect. However, according to the desired dosage of concentrate in the beverage, control unit 28 can be arranged so as to start the delivery of the concentrate either simultaneously with or after the start of water delivery and stop the delivery of concentrate either before or simultaneously with the water delivery. In that respect it should be noted that the delivery of concentrate can be stopped before the water so that the foam produced becomes whiter. The controller may thus be arranged so as to switch the liquid concentrate sources on or off sequentially or simultaneously at any desired dosing time intervals according to the final mixture formulation requirements.

EXAMPLES

In the following examples, various beverages have been prepared in connection of a dispensing device and method of the invention, various preparation parameters have been experimented.

Example 1

A cappuccino beverage was prepared using two water jets (which collided together above a cup) and one liquid concentrate stream (which was directed to the point IP of the meeting of the two water jets). The angle between water jets was 30 degrees. Water flow rate and linear velocity were 10 ml/s and 900 cm/s, respectively. Viscosity of the liquid concentrate used was 300 cP. Water temperature was 85° C.; concentrate was used at ambient temperature. The common intersection point IP of water jets and concentrate stream was above a cup. The distance between the water nozzle ejection orifices and the water jets meeting point IP was 15 mm.

No liquid stratification, and high foam volume (1 part of foam and 2 parts of liquid) and stability with desirable appearance of bubbles were observed in dispensed cappuccino drink.

Example 2

A cappuccino beverage was prepared using two water jets and one liquid concentrate stream under conditions provided by Example 1, but with 5 degree angle between water jets.

No liquid stratification and high foam volume was observed. However, foam stability was poor, and foam appearance was undesirable due to soap-like bubbles generated.

Example 3

A cappuccino beverage was prepared using two water jets and one liquid concentrate stream under conditions provided by Example 1, but with 70 degree angle between water jets.

No liquid stratification was observed. However, foam volume was low, and a lot of splashing around a cup was observed.

Example 4

A cappuccino beverage was prepared under conditions provided by Example 1 but with water linear velocity 1250 cm/s and liquid concentrate with viscosity 2000 cP.

No liquid stratification, and high foam volume and stability with desirable appearance of bubbles were observed in dispensed cappuccino drink.

Example 5

A cappuccino beverage was prepared under conditions provided by Example 1 but with water linear velocity 1250 cm/s and liquid concentrate with viscosity 2500 cP.

Liquid stratification was observed in dispensed cappuccino drink.

Example 6

The beverage dispensing device of the invention was used for milk frothing. Product was prepared using two water jets (which collided together above the cup) and a milk concentrate (30% total solids) stream (which was directed to the point of the meeting of the two water jets). The angle between water jets was 30 degrees. Water flow rate and linear velocity were 10 ml/s and 900 cm/s, respectively. Viscosity of the milk concentrate used was 600 cP. Water temperature was 85° C.; milk concentrate was used at ambient temperature. The meeting point of water jets and concentrate stream was above a cup. The distance between the water nozzles ejection orifice and the water jets meeting point was 15 mm.

No liquid stratification, and high foam volume (foam to liquid ratio 0.7-0.8) and stability with desirable appearance of bubbles were observed in dispensed milk concentrate.

Example 7

A cappuccino beverage was prepared using two water jets (which collided together above the cup) and one liquid concentrate stream (which was directed to the point of the meeting of the two water jets). The angle between water jets was 30 degrees. Water flow rate and linear velocity were 10.2 ml/s and 1,000 cm/s, respectively. Viscosity of the liquid concentrate used was 540 cP. Water temperature was 85° C.; concentrate was used at ambient temperature. The meeting point of water jets and concentrate streams was above a cup. The distance between the water nozzle ejection orifices and the water jets meeting point IP was 15 mm.

No liquid stratification, and high foam stability (more than 50% after 15 min) with desirable appearance of bubbles were observed in dispensed cappuccino drink.

Example 8

A cappuccino beverage was prepared using two water jets and one liquid concentrate stream under conditions provided by Example 7, but with 14.0 ml/s water flow rate.

No liquid stratification, and high foam stability (more than 50% after 15 min) with desirable appearance of bubbles were observed in dispensed cappuccino drink.

Example 9

A cappuccino beverage was prepared using two water jets and one liquid concentrate stream under conditions provided by Example 7, but with 5.1 ml/s water flow rate.

No liquid stratification was observed. However, foam amount was low and stability was poor.

Example 10

A cappuccino beverage was prepared using two water jets and one liquid concentrate stream under conditions provided by Example 7, but with 25.2 ml/s water flow rate.

No liquid stratification was observed. However, foam stability was poor.

Example 11

A cappuccino beverage was prepared using two water jets (which collided together above the cup) and one liquid concentrate stream (which was directed to the point of the meeting of the two water jets). The angle between water jets was 30 degrees. Water flow rate and linear velocity were 13.5 ml/s and 1,000 cm/s, respectively. Viscosity of the liquid concentrate used was 540 cP. Water temperature was 85° C.; concentrate was used at ambient temperature. The meeting point of water jets and concentrate streams was above a cup. The distance between the water nozzle ejection orifices and the water jets meeting point IP was 15 mm.

No liquid stratification, and high foam volume and stability with desirable appearance of bubbles were observed in dispensed cappuccino drink.

Example 12

A cappuccino beverage was prepared using two water jets and one liquid concentrate stream under conditions provided by Example 11, but with 200 cm/s water linear velocity.

Liquid stratification and low foam volume were observed in dispensed cappuccino drink.

Example 13

A cappuccino beverage was prepared using two water jets and one liquid concentrate stream under conditions provided by Example 11, but with 1350 cm/s water linear velocity.

No liquid stratification but foam volume lower than in Example 11 were observed in dispensed cappuccino drink.

Example 14

A cappuccino beverage was prepared using two water jets (which collided together above the cup) and one liquid concentrate stream (which was directed to the point of the meeting of the two water jets). The angle between water jets was 30 degrees. Water flow rate and linear velocity were 13.5 ml/s and 1,000 cm/s, respectively. Viscosity of the liquid concentrate used was 540 cP. Liquid concentrate flow rate was 5.0 ml/s. Water temperature was 85° C.; concentrate was used at ambient temperature. The meeting point of water jets and concentrate stream was above a cup (distance between the water nozzle ejection orifice and the water jets meeting point was 15 mm).

No liquid stratification, and high foam volume and stability with desirable appearance of bubbles were observed in dispensed cappuccino drink.

Example 15

A cappuccino beverage was prepared under conditions provided by Example 14 but with concentrate flow rate 20 ml/s.

No liquid stratification, and high foam volume and stability with desirable appearance of bubbles were observed in dispensed cappuccino drink.

Example 16

A coffee beverage was prepared using two water jets (which collided together above the cup) and a coffee liquid concentrate stream (which was directed to the point of the meeting of the two water jets). The angle between water jets was 30 degrees. Water flow rate and linear velocity were 10 ml/s and 900 cm/s, respectively. Viscosity of the coffee liquid concentrate used was 870 cP. Water temperature was 85° C.; the concentrate was used at ambient temperature. The meeting point of water jets and concentrate stream was above a cup. The distance between the water nozzle ejection orifice and the water jets meeting point was 15 mm. No liquid stratification was observed in the dispensed drink.

It will be understood that the present invention has been described with reference to a particular embodiment, which is an illustration of the principles of the invention. Numerous modifications may be made by those skilled in the art without departing from the true spirit and scope of this invention defined by the appended claims. For example, depending on the number and type of beverages to be prepared the number of water nozzles and concentrate nozzles may vary and the control unit may be adapted, preferably with the dispensing device providing at least two water jets and one liquid concentrate stream that meet at one common intersection point above a container for collecting prepared beverage.

Also, while the shape of the water jets and concentrate streams generated is preferably cylindrical one may envisage in variants using water jets and /or concentrate streams of different shapes such as for example of star, square, triangle, oval, oblong, or other cross-sectional shape. In variant one could also envisage arranging the ejection orifices of the liquid nozzles closer to the vertical axis, than that of the concentrate nozzles, and in another embodiment, the one or more of the concentrate streams can join and be directed together to the intersection location.

What is claimed is:

1. A food product dispenser, comprising:
    a fluid source;
    at least two fluid nozzles;
    a flowable food component source;
    a food component nozzle; and
    a delivery device connecting the fluid source to the fluid nozzles and the component source to the component nozzle for delivering a fluid and a food component from the respective source to the respective nozzle, wherein the delivery device and nozzles are configured such that the fluid and component are ejected from the fluid and component nozzles, respectively, in at least two fluid streams and at least one component stream, respectively, which intersect each other at an intersection location at which at least one of the streams is substantially in a state of free fall;
    wherein the delivery device and nozzles are configured for ejecting the streams in a configuration such that the streams mix by collision to produce a food product which is directed to a dispensing location and wherein the fluid streams are ejected at a linear velocity that is greater than the linear velocity of the food component stream.

2. The dispenser of claim 1, wherein the streams at the intersection location are unsupported by any solid structure and mix prior to filling a container.

3. The dispenser of claim 1, wherein each fluid stream is a jet, and the fluid streams have reduced speeds downstream of the intersection location.

4. The dispenser of claim 1, further comprising a dispensing bay configured for receiving a container at the dispensing location for receiving the food product therein.

5. The dispenser of claim 1, wherein the food product is a beverage, with the fluid streams comprising water and the component stream comprising a liquid beverage concentrate.

6. The dispenser of claim 1, wherein the nozzles comprise ejection orifices, with the ejection orifices of the component nozzle being disposed closer than the ejection orifices of the fluid nozzles to a common central axis of the streams that extends through the intersection location in a substantially vertical direction to cause mixing with energy sufficient to form a froth on the food product.

7. The dispenser of claim 6, wherein the component nozzle is configured for directing the component stream substantially along the central axis.

8. The dispenser of claim 6, wherein the first and second streams exiting the orifices form an angle of between about 20 and 60 degrees.

9. The dispenser of claim 6, wherein the streams delivered through each fluid nozzle orifice has a flow rate of between about 5 and 25 ml/s and a linear velocity of between about 9 and 2000 cm/s, and the component is a liquid concentrate having a viscosity between about 1 and 5000 cP.

10. The dispenser of claim 9, wherein the streams delivered through each fluid nozzle orifice has a flow rate of between about 7 an 15 ml/s and a linear velocity of between about 650 and 1250 cm/s, and the component is a liquid concentrate having a viscosity between about 300 and 1500 cP.

11. The dispenser of claim 6, wherein the fluid nozzle orifices have a diameter of between about 0.5 to 1.5 mm, and the component nozzle has a diameter of between about 1 and 3.5 mm.

12. The dispenser of claim 8, wherein the fluid nozzles are spaced from the intersection location by a distance of between about 1 and 200 mm.

13. The dispenser of claim 1, wherein the delivery device comprises:
    a fluid pump configured for pumping the fluid from the fluid source to the fluid nozzles at a sufficient flow rate for producing the fluid stream; and
    a component pump configured for pumping the component from the component source to the component nozzle at a sufficient flow rate for producing the component stream.

14. The dispenser of claim 13, wherein at least one of the pumps is configured to deliver pulses of the fluid or component.

15. The dispenser of claim 13, wherein the pumps are peristaltic pumps.

16. The dispenser of claim 15, further comprising a controller associated with the pumps for controlling the flow rates.

17. The dispenser of claim 1, wherein:
    the component source comprises a plurality of component sources;
    the component nozzle comprises a plurality of component nozzles for dispensing different components from the component sources to the intersection location; and
    the delivery device is configured for selectively activating and deactivating the flow from the component nozzles for dispensing a selected combination of one or more of the components to the intersection location depending on the type of food product selected for dispensing.

18. The dispenser of claim 17, further comprising a controller configured for controlling the delivery device for sequentially dispensing the components to the intersection location.

19. The dispenser of claim 17, further comprising a controller configured for controlling the delivery device for substantially simultaneously dispensing the components to the intersection location and a thermal exchange unit configured for heating or cooling the fluid to be dispensed.

* * * * *

UNITED STATES PATENT AND TRADEMARK OFFICE
CERTIFICATE OF CORRECTION

| | | |
|---|---|---|
| PATENT NO. | : 7,651,008 B2 | Page 1 of 1 |
| APPLICATION NO. | : 11/608394 | |
| DATED | : January 26, 2010 | |
| INVENTOR(S) | : Sher et al. | |

It is certified that error appears in the above-identified patent and that said Letters Patent is hereby corrected as shown below:

Column 16:
Line 3 (claim 9, line 3), after "between about", delete "9" and insert -- 10 --.
Line 15 (claim 12, line 1), after "The dispenser of claim", delete "8" and insert -- 7 --.

Signed and Sealed this

Sixteenth Day of March, 2010

David J. Kappos
*Director of the United States Patent and Trademark Office*